(12) United States Patent
Taylor

(10) Patent No.: US 6,796,323 B1
(45) Date of Patent: Sep. 28, 2004

(54) DUAL SEAT VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 54 days.

(21) Appl. No.: 10/350,654

(22) Filed: Jan. 24, 2003

(51) Int. Cl.7 ............................................. G05D 16/16
(52) U.S. Cl. ..................... 137/102; 137/492; 137/508; 137/627.5
(58) Field of Search ................................ 137/102, 488, 137/492, 625.25, 625.26, 625.66, 627.5, 508; 251/28, 368, 333

(56) References Cited

U.S. PATENT DOCUMENTS

| | | | | |
|---|---|---|---|---|
| 3,273,589 A | * | 9/1966 | Dollison et al. ............ | 137/495 |
| 3,294,111 A | * | 12/1966 | Abercrombie et al. ...... | 137/492 |
| 3,930,515 A | * | 1/1976 | Kennedy et al. ............ | 137/102 |
| 3,955,597 A | * | 5/1976 | Oneyama et al. ...... | 137/625.25 |
| 3,957,074 A | * | 5/1976 | Taft ............................ | 137/102 |
| 6,161,571 A | * | 12/2000 | Taylor ........................ | 137/492 |

* cited by examiner

Primary Examiner—David A. Scherbel
Assistant Examiner—Ramesh Krishnamurthy
(74) Attorney, Agent, or Firm—Fellers, Snider, et al.

(57) ABSTRACT

A dual seat valve which selectively supplies and releases fluid to and from a reservoir, such as a dome of a main valve in a pressure relief system. The valve comprises a housing with an interior chamber and an annular first seat surface. A valve assembly is configured for sliding movement within the housing, the valve assembly comprising a hollow stem with a distal end having an annular second seat surface. A sealing member such as a spherical ball is disposed within the interior chamber. In a first valve position, the second seat surface extends through and above the first seat surface, supporting the sealing member and permitting fluidic flow through the first seat surface. In a second valve position, the second seat surface retracts and the sealing member is supported on the first seat surface, permitting fluidic flow through the second seat surface.

17 Claims, 7 Drawing Sheets

DUAL SEAT VALVE

FIELD OF THE INVENTION

This invention relates generally to the field of pressurized fluid systems and more particularly, but not by way of limitation, to a dual seat valve used to charge and evacuate a fluidic reservoir, such as a dome of a main valve to establish an overpressure path for a fluid.

BACKGROUND

Pressurized fluid systems are provided with pressure relief capabilities to prevent injury to personnel and damage to equipment in the event of an overpressure condition.

A commonly employed overpressure valve assembly, such as exemplified by U.S. Pat. No. 3,211,174 issued to Weise et al., generally comprises a normally closed main valve which is activated by an adjacent pilot valve. The main valve includes a piston assembly which is biased in a closed position against a valve seat by pressurized fluid supplied by the pilot valve. When an overpressure condition is reached, the pilot valve operates to reduce the pressure upon the piston, allowing the inlet fluid to advance the piston away from the valve seat and open the main valve.

While these and other prior art valve configurations have been found operable, there remains a continued need for improved configurations that are more precise, reliable and cost effective to manufacture and operate.

SUMMARY OF THE INVENTION

In accordance with preferred embodiments, a pilot valve is provided to charge and discharge a reservoir with fluid, such as a dome of a main valve in a pressure relief system.

The pilot valve includes housing which defines an interior chamber. An annular first seat surface is supported within the housing in communication with the interior chamber.

A valve assembly is configured for sliding movement within the housing, and includes a hollow stem with a distal end having an annular second seat surface. The second seat surface is extendable through a central orifice of the first seat surface.

A sealing member is disposed within the interior chamber to establish respective fluidic seals with the first and second seat surfaces. The sealing member preferably comprises a spherical ball, although other configurations can readily be used as desired.

During operation the pilot valve preferably moves between a first valve position and a second valve position. In the first valve position, the second seat surface extends through the first seat surface and abuttingly supports the sealing member to establish a fluidic seal between the sealing member and the second seat surface. This permits fluid to pass from the interior chamber into a gap between the sealing member and the first seat surface and on to charge the reservoir.

In the second valve position, the second seat surface is retracted away from the first seat surface so that the first seat surface abuttingly supports the sealing member to establish a fluidic seal between the sealing member and the first seat surface. This permits fluid to pass from the reservoir into a gap between the sealing member and the second seat surface to discharge the reservoir.

While preferred embodiments are generally directed to a pilot valve in an overpressure valve assembly, it is readily contemplated that the invention as disclosed and claimed is not so limited, but can be readily used in various other types of fluid delivery systems in various other fields.

These and various other features and advantages which characterize the claimed invention will be apparent from a reading of the following detailed description and a review of the associated drawings.

DETAILED DESCRIPTION

Figure 1:
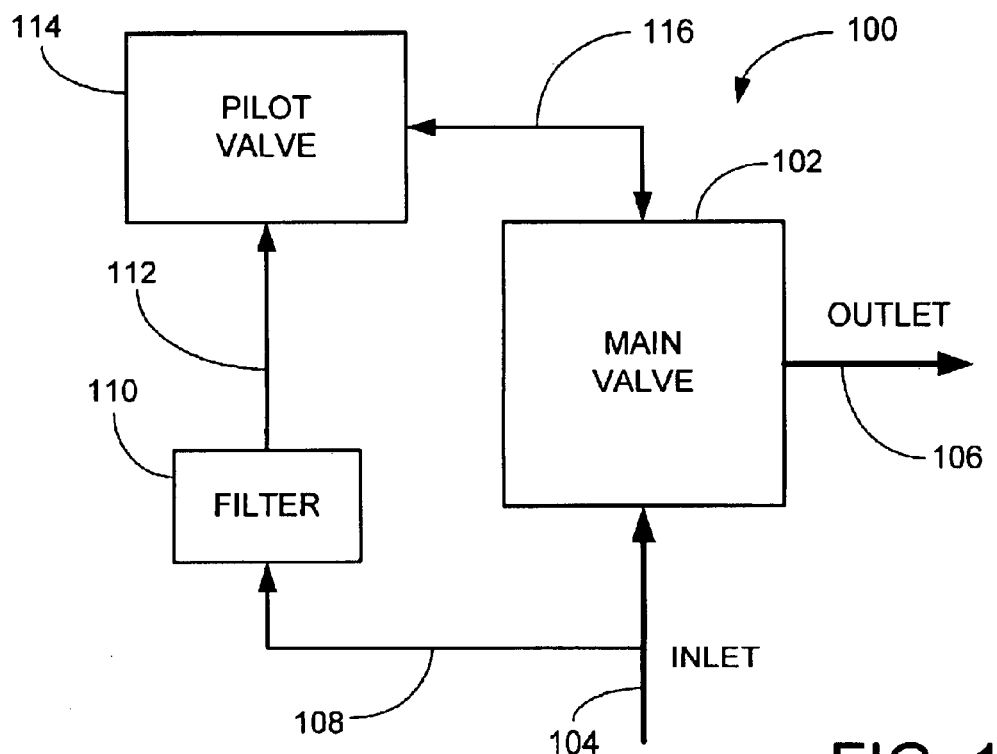
FIG. 1 provides a generalized block diagram of an overpressure valve assembly constructed and operated in accordance with preferred embodiments of the present invention.

FIG. 1 generally illustrates an overpressure valve assembly 100 constructed and operated in accordance with preferred embodiments of the present invention. The valve assembly 100 is configured to establish a bypass path for a pressurized fluid in response to the occurrence of an overpressure condition.

The valve assembly 100 includes a normally closed main valve 102 with inlet conduit 104 and outlet conduit 106. Branch conduit 108 supplies a portion of the inlet fluid to a filter 110, and the filtered inlet fluid is supplied by conduit 112 to a pilot valve 114. The pilot valve 114 selectively regulates the flow of the pressurized, filtered fluid to and from the main valve 102 via conduit 116 to open and close the main valve 102.

Figure 2:
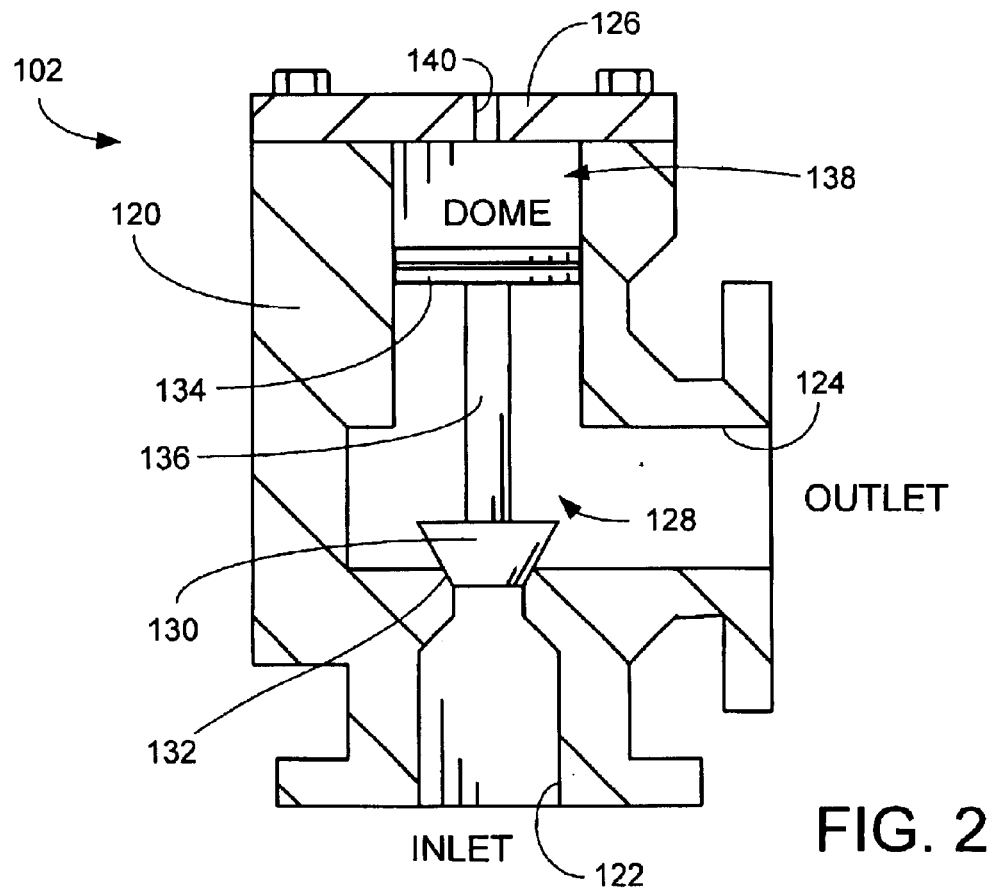
FIG. 2 provides an elevational, cross-sectional representation of the main valve of FIG. 1.

FIG. 2 provides a simplified representation of the main valve 102. The main valve 102 can take any number of forms and various details have been omitted to simplify the present discussion. FIG. 2 is thus intended to be illustrative in nature and is not limiting to the scope of the claimed invention.

The main valve 102 is shown in FIG. 2 to have a housing 120 with inlet and outlet ports 122, 124 in respective fluidic communication with the inlet and outlet conduits 104, 106 shown in FIG. 1. A bonnet 126 mates with the housing 120 to provide a sealed interior.

A moveable piston assembly 128 (shown in a normally closed position) includes a disc plunger 130 which seals against a valve seat surface 132. A piston 134 is coupled to the disc plunger 130 via shaft 136 and serves in conjunction with the housing 120 and bonnet 126 to define a fluidic reservoir 138 commonly referred to as a dome. The dome 138 receives pressurized fluid from the pilot valve 114 via port 140.

During normal operation, the pressure of the pressurized fluid within the dome 138 is nominally at the same pressure as the pressure of the inlet fluid at the inlet port 122. However, because the exposed cross-sectional area of the piston 136 is greater than the exposed cross-sectional area of the disc plunger 130, the net result is a downwardly directed biasing force upon the piston assembly 128 that maintains the main valve in the normally closed position.

Figure 3:
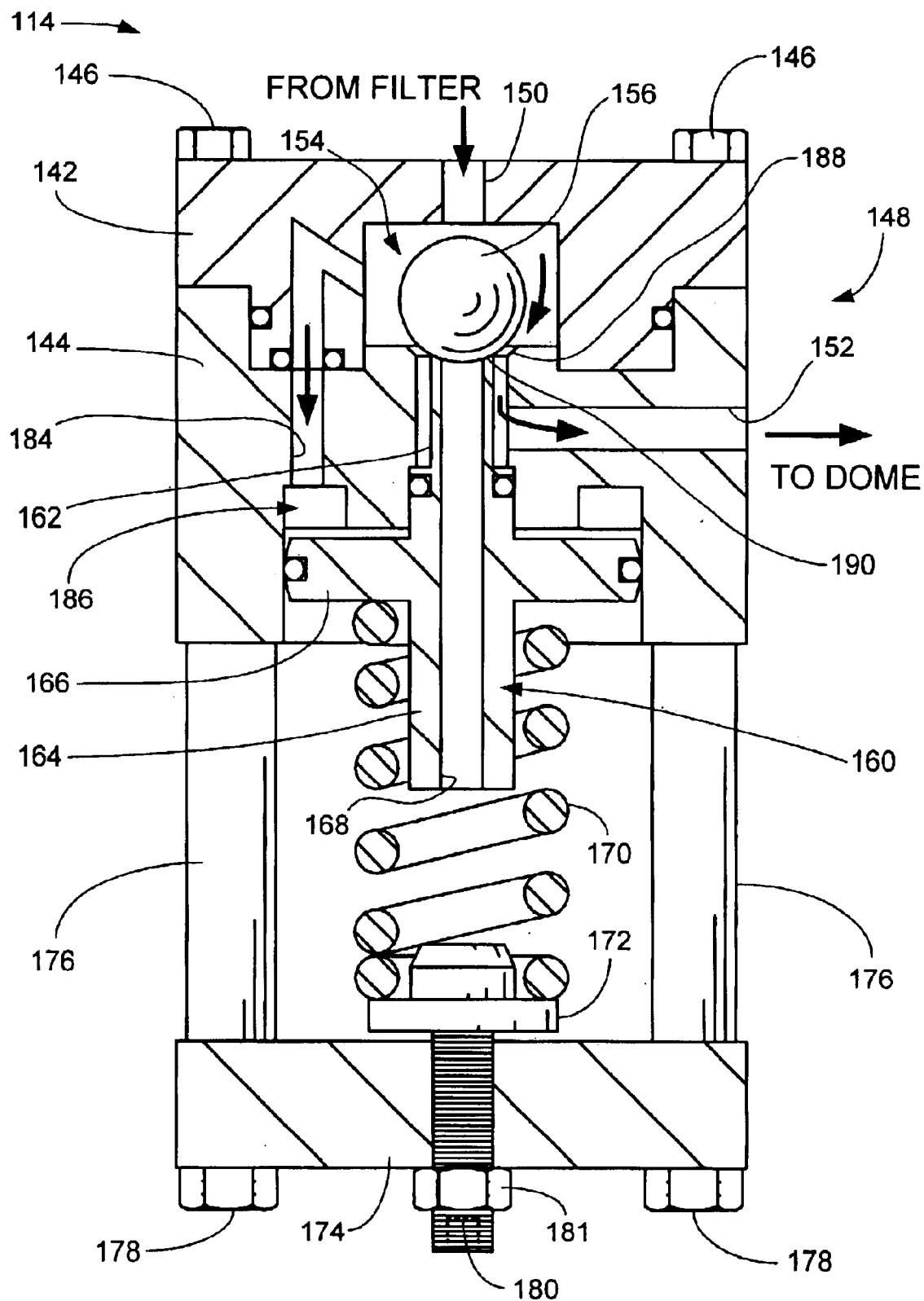
FIG. 3 provides an elevational, cross-sectional representation of the pilot valve of FIG. 1 which operates to provide pressure to a dome area of the main valve.

FIG. 3 provides a detailed view of the pilot valve 114 during normal operation. A cover 142 is affixed to a body portion 144 via fasteners 146 to form an enclosed housing 148. An inlet port 150 extends through the cover 142. The port 150 is in fluidic communication with the conduit 112 (FIG. 1) to receive filtered pressurized fluid from the filter 110. A port 152 in the body portion 144 is in fluidic communication with the conduit 116 (FIG. 1) to selectively transfer fluid to and from the dome 138.

The housing 148 defines an interior chamber 154 which receives a moveable sealing member 156. The sealing member 156 preferably comprises a spherical ball, although other configurations and shapes can readily be used. A retaining member (such as a coil spring, not shown) can be placed within the chamber 154 to ensure the sealing member 156 remains in a centered relationship within the chamber 154, as desired. The chamber 154 is also referred to herein as a "first interior chamber."

A moveable valve assembly 160 is configured for sliding movement within the housing 148. The valve assembly 160 preferably includes first and second stems 162, 164 which project from opposing sides of a centrally disposed piston 166. A vent orifice 168 continuously extends through the first stem 162, the medial portion of the piston 166 and the second stem 164.

The valve assembly 160 is normally biased upwardly against the housing 148 via a biasing member 170, preferably comprising a coiled spring. The biasing member 170 bears against a tensioner 172 supported by a support plate 174. The support plate 174 is affixed to the housing 148 via standoffs 176 and fasteners 178. The tensioner 172 can be adjusted to change the biasing force via turning adjustment aperture 180 and then locked in place with nut 181.

The cover 142 further includes an internal port 182 which opens at one end to the interior chamber 154. The opposing end of the port 182 communicates with an internal port 184 in the body portion 144. The port 184 opens to an annular chamber 186 defined by the body portion 144 and the valve assembly 160. The chamber 186 is further referred to herein as a "second interior chamber."

The ports 182, 184 permit fluidic flow of the pressurized fluid from the interior chamber 154 to the annular chamber 186. This establishes a downwardly directed force upon the piston 166 in opposition to the upwardly directed biasing force supplied by the biasing member 170. Preferably, during normal operation the upwardly directed force from the member 170 is greater than then downwardly directed force from the fluid so that the valve assembly 160 remains biased against the housing 148 as shown in FIG. 3.

The housing member 144 further includes an annular, stationary first seat surface 188. The first seat surface is configured to establish a fluidic seal with the sealing member 156 when the sealing member comes to rest thereagainst.

The first stem 162 of the valve assembly 160 further includes an annular, moveable second seat surface 190. As with the first seat surface 188, the second seat surface 190 is also configured to establish a fluidic seal with the sealing member 156 when the sealing member comes to rest against the second surface. The second seat surface 190 extends through a central orifice (not numerically designated) defined by the first seat surface 188, as shown.

In a preferred embodiment, the sealing member 156, the body portion 144 and the valve assembly 160 are all formed of a common material, such as stainless steel, and the respective seat surfaces 188, 190 are lapped or otherwise processed to provide respective metal-on-metal fluidic seals. In other preferred embodiments, resilient seals (not shown) can be included to provide one or both of the fluidic seals, as desired.

During normal operation, the pressurized fluid at inlet conduit 104 in FIG. 1 is below a predetermined overpressure threshold. This results in the valve assembly 160 abutting the body portion 144 as shown in FIG. 3. In this position, the axial length of the first stem 162 is sufficient to cause the second seat surface 190 to extend through and above the first seat surface 188. The second seat surface 190 supports the sealing member 156, thereby establishing a fluidic seal between the second seat surface 190 and the sealing member 156.

At the same time, a portion of the pressurized fluid from the chamber 154 is permitted to flow between the first and second seat surfaces 188, 190. This flow thus passes between the sealing member 156 and the first seal surface 188, along the exterior surface of the first stem 162, through the conduit 152 and on to the dome 138 in the main valve 102 (see FIG. 2).

Figure 4:
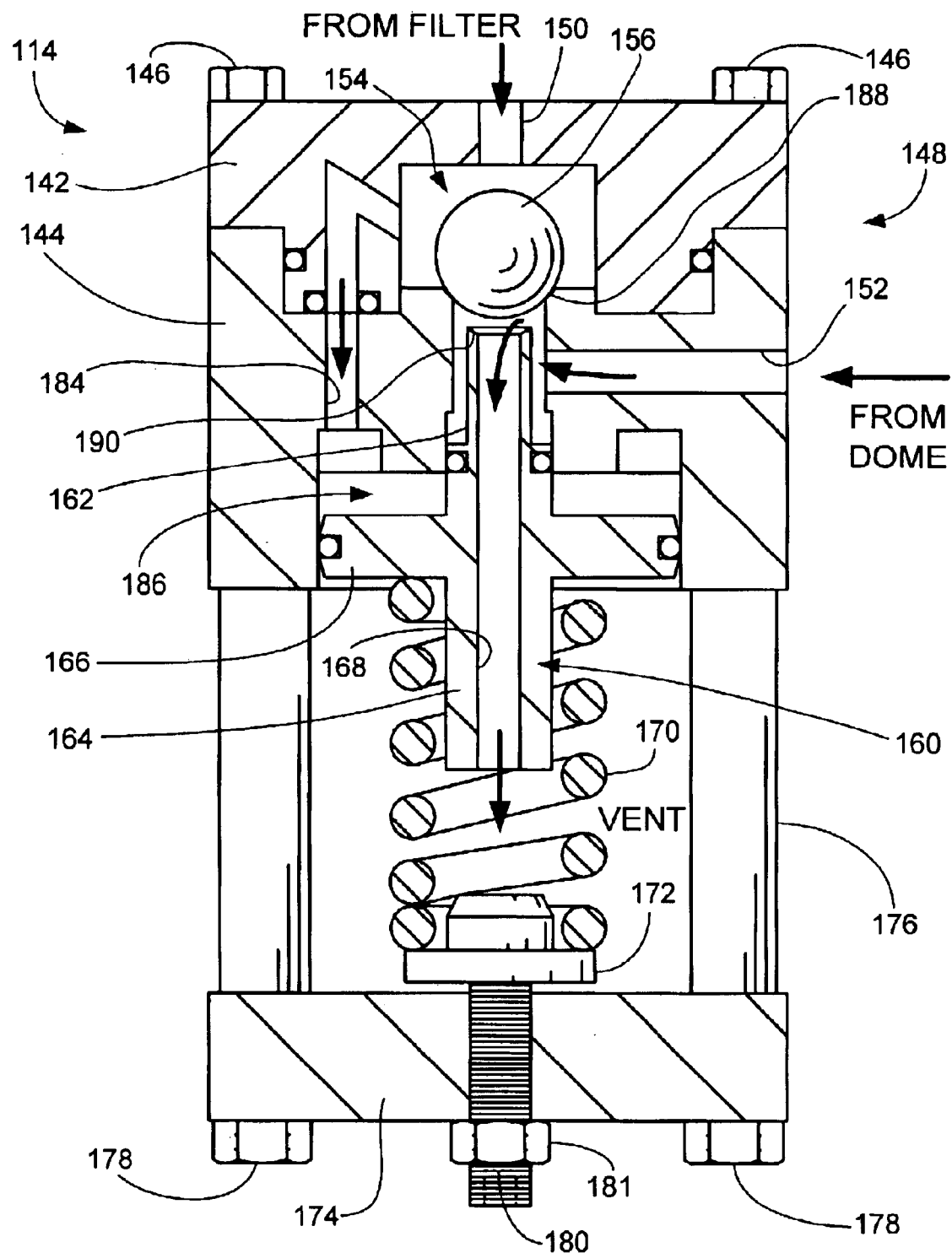
FIG. 4 illustrates the pilot valve of FIG. 3 in the event of an overpressure condition.

When the pressure of the fluid in the inlet conduit 104 (FIG. 1) exceeds the predetermined threshold, however, the configuration of the pilot valve 104 moves to that shown in FIG. 4. That is, the pressure of the inlet fluid in the annular chamber 186 (supplied via chamber 154 and ports 182, 184) exerts a downwardly directed force upon the piston 166 sufficient to overcome the upwardly directed biasing force of by the biasing member 170, thereby moving the piston downwardly as shown. The extent of the downward movement of the valve assembly 160 is preferably mechanically limited using a snap ring or other feature (not shown for clarity).

The pilot valve 114 is preferably configured so that the downward movement of the valve assembly 160 is sufficient to cause the second seat surface 190 to move below the first seat surface 188 of the body portion 144. Thus, the sealing member 156 comes to rest against the first seat surface 188 and the second seat surface 190 continues to retract to establish a gap between the sealing member 156 and second seat surface 190.

The pressurized fluid in the dome 138 is now permitted to flow from the dome 138, through conduit 116 (FIG. 1), through port 152, along the outer surface of the first stem 162, through the vent orifice 168 in the valve assembly 160 and to the atmosphere (or other venting sink). As discussed above, such reduction of pressure in the dome 138 results in the movement of the main valve 102 to the open position.

Once the pressure of the inlet fluid falls back below the set point, the pilot valve 114 resets to the configuration shown in FIG. 3. That is, the pressure of the fluid in chamber 186 becomes no longer sufficient to overcome the biasing force supplied by the biasing member 170, and the valve assembly 160 once again moves back up as shown in FIG. 3.

The resulting upward movement of the second seat surface 190 lifts the sealing member 156 off of the first seat surface 188, which allows the pressurized fluid from the interior chamber 154 to pass through the port 152 and recharge the dome 138 in the main valve 102. The buildup of pressure within the dome 138 causes the piston assembly 128 to move downwardly against the valve seat surface 132, thereby moving the main valve 102 to the closed position.

Figure 5:
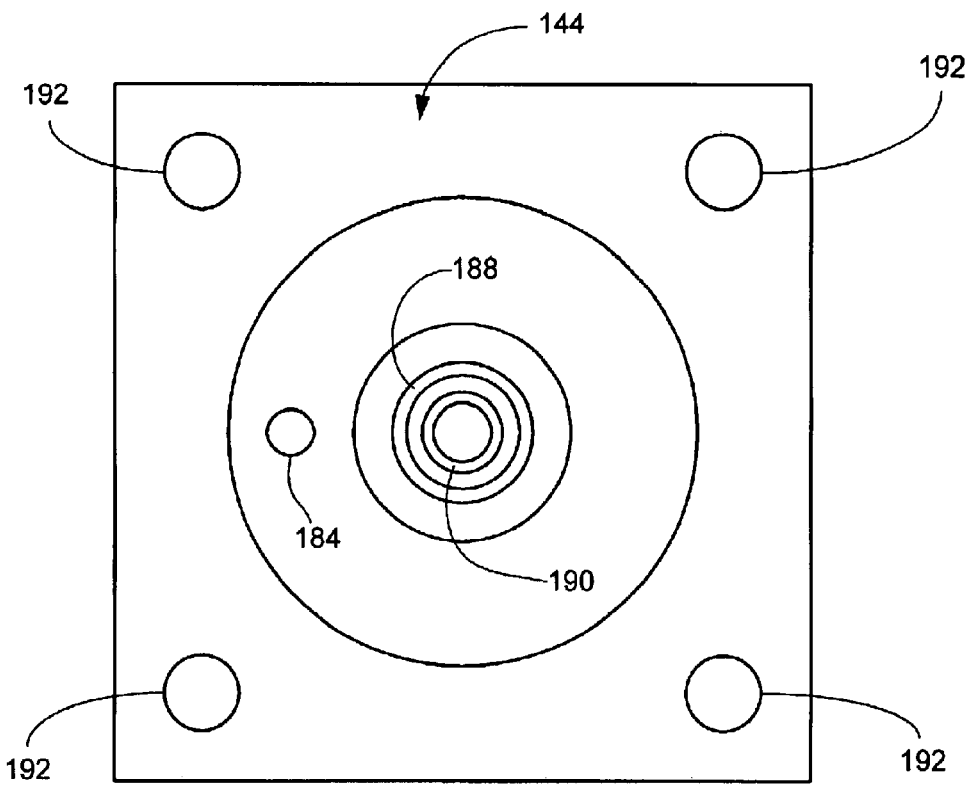
FIG. 5 provides a selected top view of the pilot valve.

FIG. 5 provides a top plan representation of the pilot valve 114 with the top cover 142 and sealing member 156 removed to better illustrate various features shown in FIGS. 3 and 4 including the first and second seat surfaces 188, 190, the internal port 184. Threaded apertures 192 receive the fasteners 146 to secure the cover 142 to the body portion 144.

Figures 6, 7:
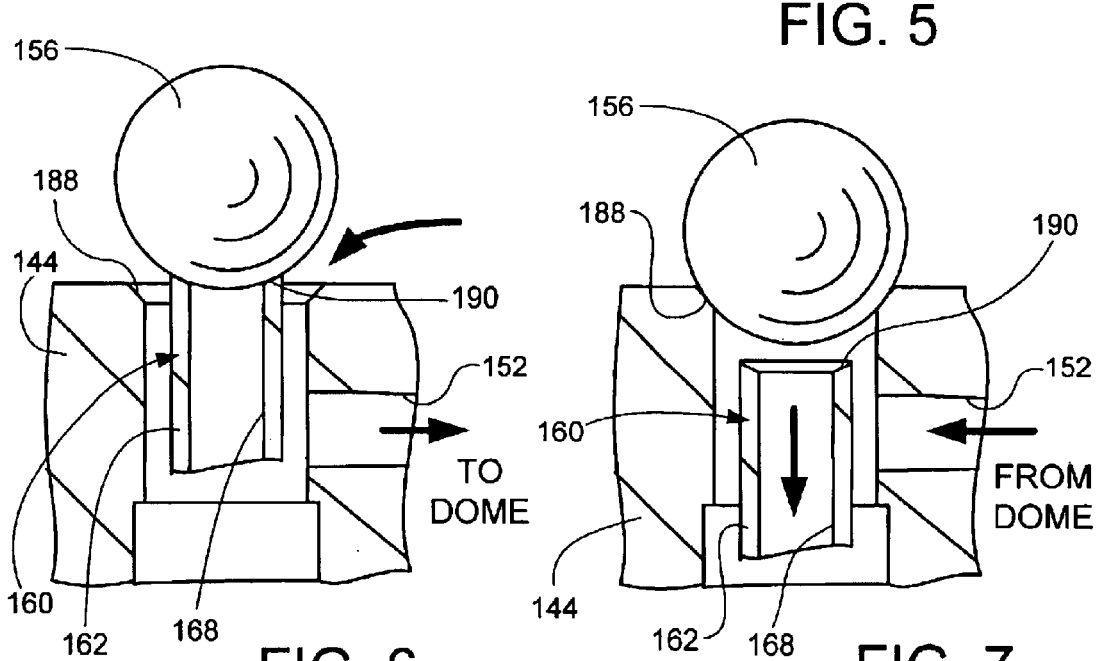
FIGS. 6 and 7 show portions of the pilot valve in greater detail to further illustrate operation of the pilot valve.

FIGS. 6 and 7 show the respective operation of the sealing member 156 in conjunction with the first and second seat surfaces 188, 190 in greater detail. FIG. 6 corresponds to the dome charging configuration of FIG. 3, and FIG. 7 corresponds to the dome discharging configuration of FIG. 4. It will be noted that there is essentially zero lag between the states of FIGS. 6 and 7; that is, the sealing member 156 seats upon the first surface 188 and unseats from the second surface 190 in a substantially concurrent fashion, allowing fluid to immediately begin flowing from the dome.

Figure 8:
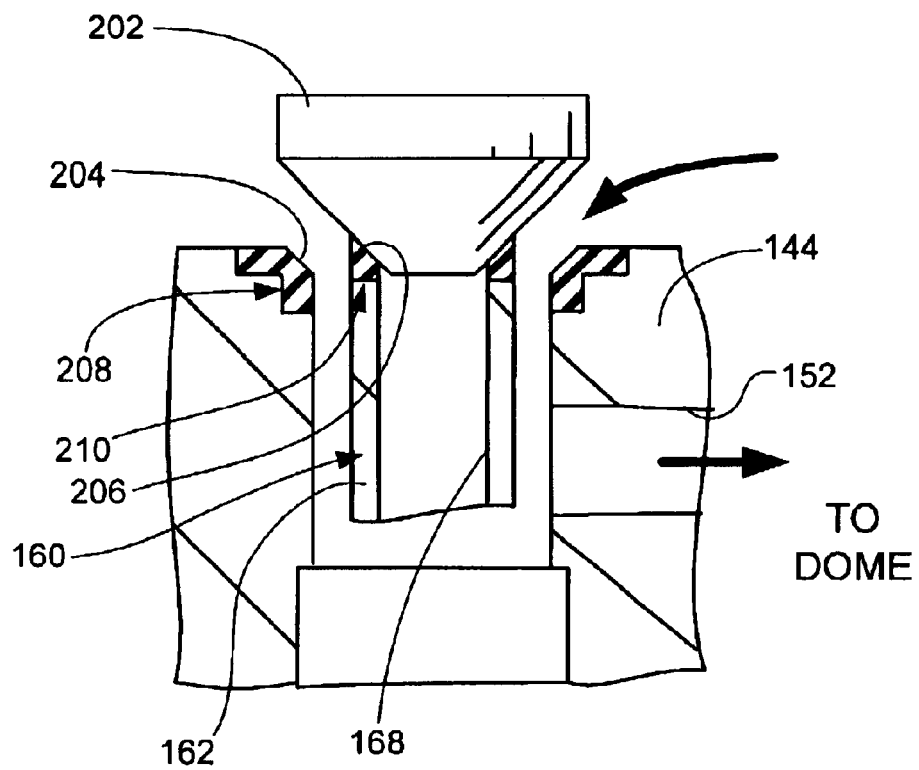
FIGS. 8 and 9 provide detailed views of portions of the pilot valve in accordance with another preferred embodiment.
Figure 9:
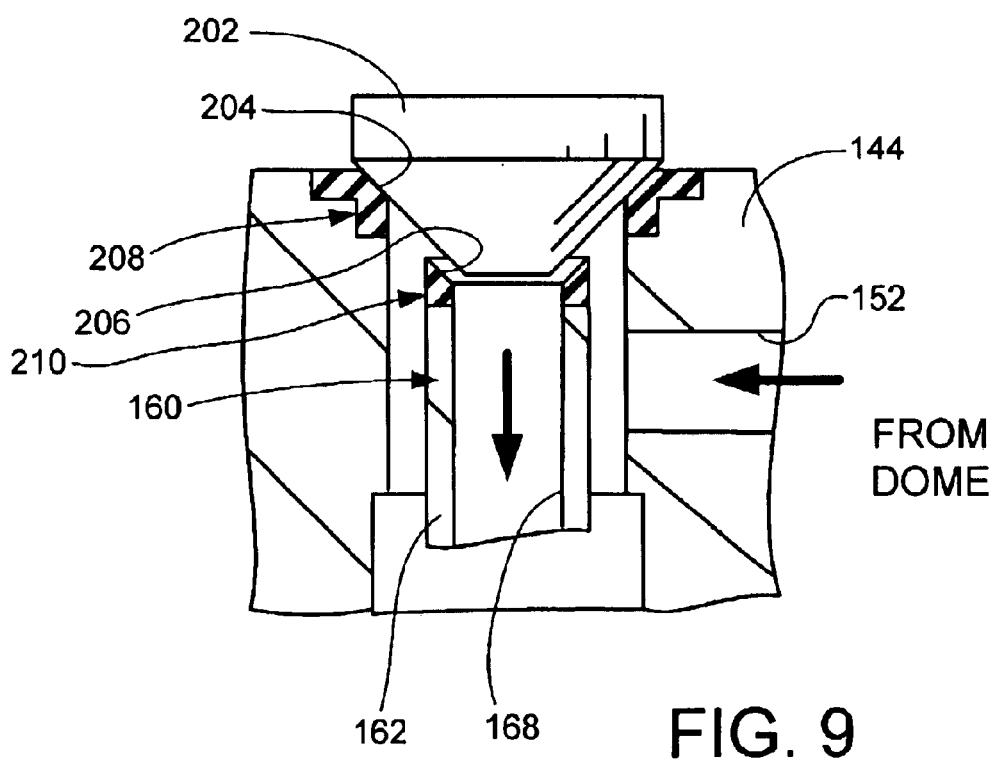

FIGS. 8 and 9 show relevant portions of the pilot valve 114 in accordance with another preferred embodiment. The embodiment of FIGS. 8 and 9 uses a disc-plunger type sealing member (numerically denoted at 202). Corresponding first and second seating surfaces 204, 206 are shaped accordingly to match the shape of the sealing member 202. The seating surfaces 204, 206 preferably comprise respective layers of resilient material 208, 210 formed of rubber or other suitable material affixed to the respective body portion 144 and valve assembly 160.

Figure 10:
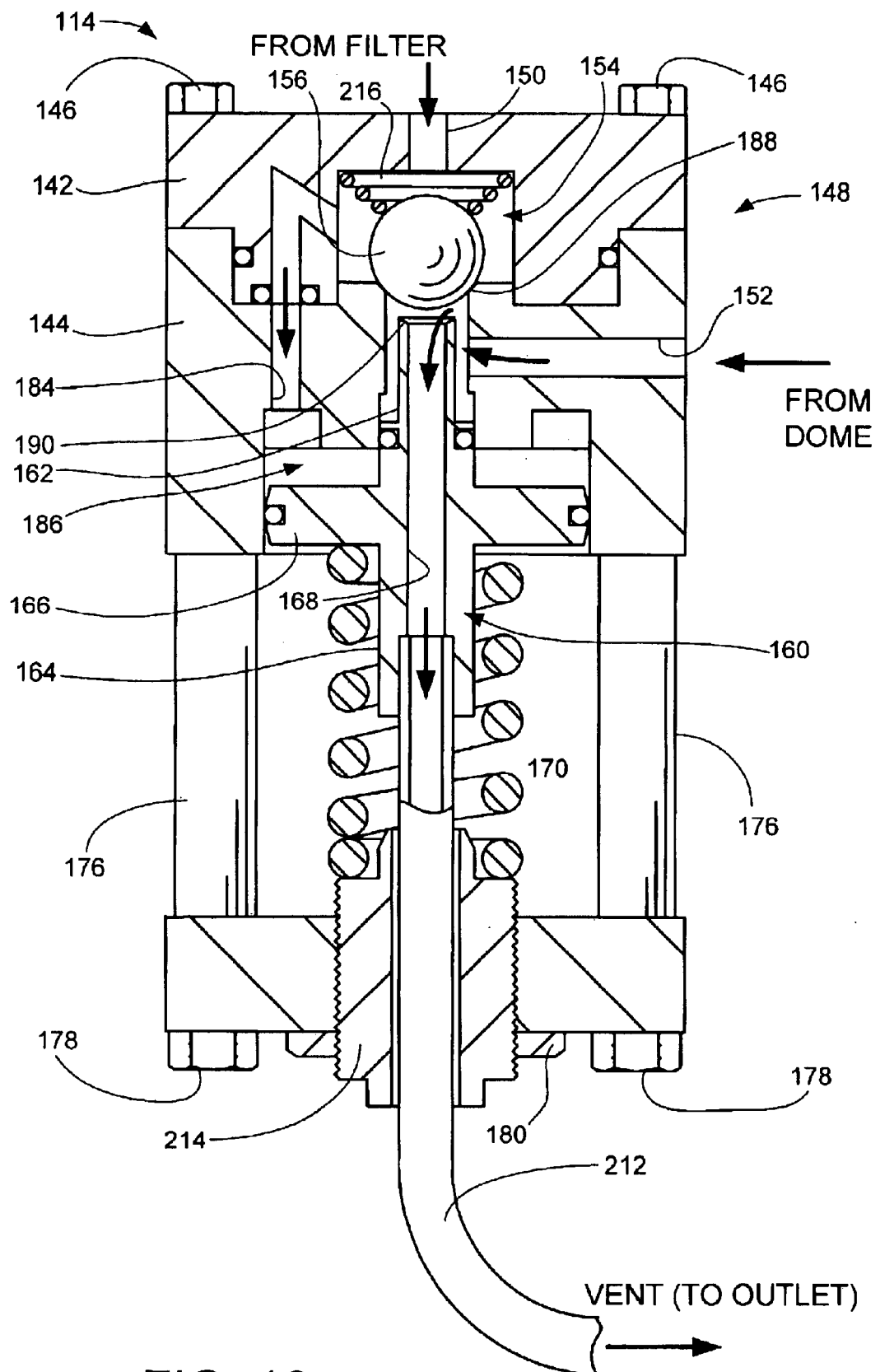
FIG. 10 provides yet another preferred embodiment of the pilot valve in which the vented fluid is directed along a conduit to the outlet conduit downstream from the main valve in FIG. 1.

FIG. 10 provides yet another preferred embodiment of the pilot valve 114. The embodiment of FIG. 10 is similar to that shown in FIG. 4. Additions include the use of a flexible vent conduit 212 which directs the vented fluid from the dome 138 to a suitable sink, such as the outlet conduit 106 downstream from the main valve 102 (shown in FIG. 1). The vent conduit 212 is preferably routed through a central aperture of tensioner 214. An advantage of the vent conduit 212 is that emissions of the fluid to the ambient atmosphere are eliminated, which can be an important environmental concern.

Another addition to the embodiment of FIG. 10 is the inclusion of a centering member 216 (preferably comprising a coiled spring) which exerts a centering force upon the sealing member 156 to maintain the sealing member 156 in a desired centered relationship within the interior chamber 154 with respect to the first and second seat surfaces 188, 190.

Figure 11:
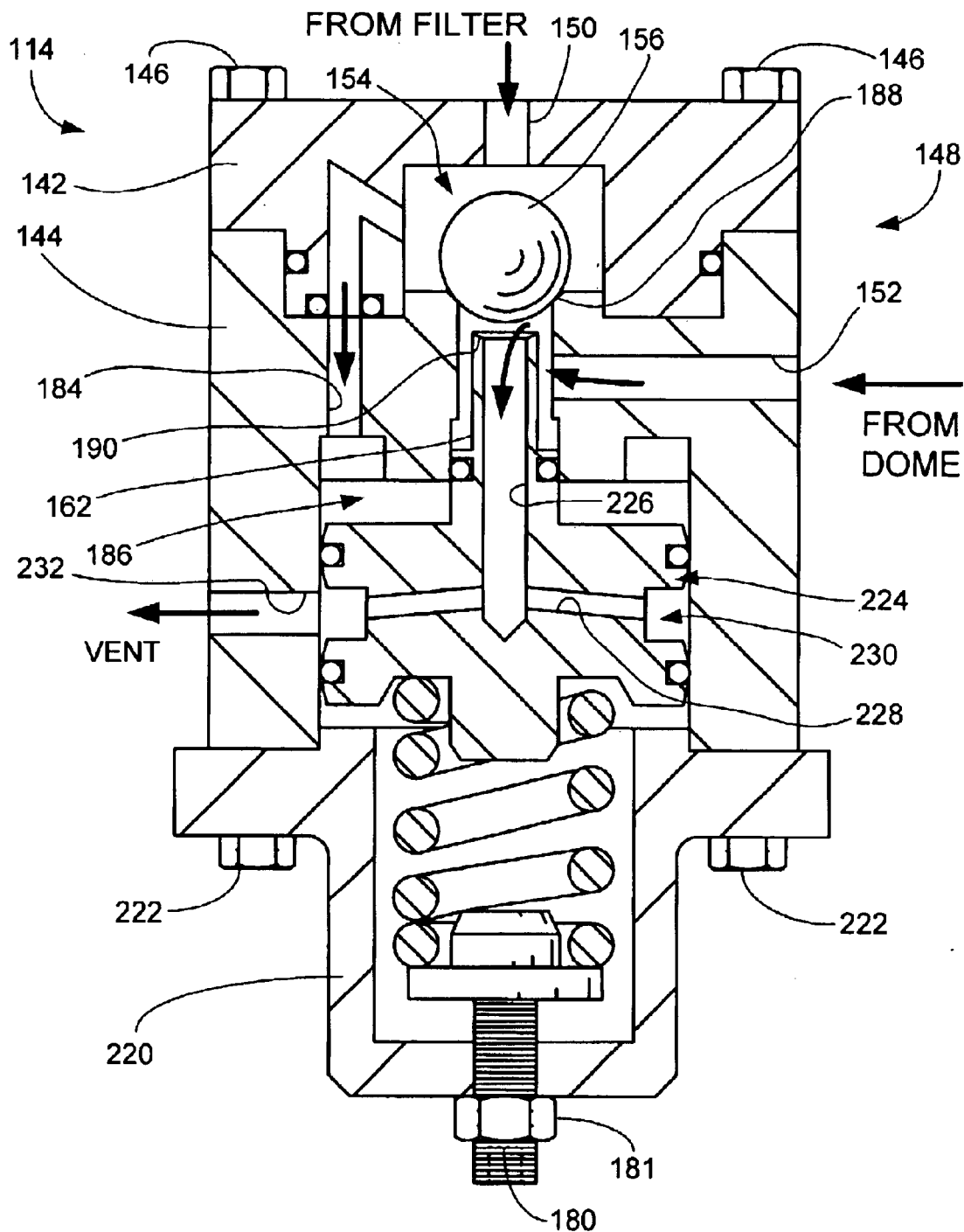
FIG. 11 provides yet another preferred embodiment of the pilot valve in which the vented fluid is directed transversely through the valve assembly.

FIG. 11 provides yet another preferred embodiment of the pilot valve 114 which is generally similar to the embodiments discussed above. For ease of discussion, like reference numerals have been used for similar components shown in previously discussed embodiments.

The pilot valve 114 includes an enclosed bell-shaped housing 220 which attaches to the body portion 144 using fasteners 222. The bell-shaped housing 220 houses the biasing member 170 and tensioner 172.

A valve assembly 224 is configured to operate in generally the same manner as the valve assembly 160 and includes the second seat surface 190 discussed above. Vented fluid passes along an interior, axially aligned orifice 226 and then along at least one transversely extending port 228 to annular channel 230. The annular channel 230 is in fluidic communication with vent outlet port 232. As mentioned above, the vented fluid can be vented from this point to the ambient atmosphere, or suitable conduit (not shown) can direct the vented fluid to a suitable sink such as the outlet conduit 106 (FIG. 1).

It will now be appreciated that the pilot valve 114 as discussed herein provides several important advantages over the prior art. The pilot valve 114 generally only uses two moving parts (the sealing member 156, 202 and valve assembly 160, 224) during operation to charge and discharge the dome 138. This provides a significantly simplified design over prior art configurations that require multiple moving parts, precisely defined orifices, etc. This enhances manufacturability and reliability of the system. Also, the set point at which the pilot valve 114 operates can be easily and precisely adjusted to ensure proper operation of the system 100.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the assembly without departing from the spirit and scope of the present invention.

In addition, although the embodiments described herein are generally directed to providing a pilot valve for use in a pressurized fluid system to close a main valve, it will be appreciated by those skilled in the art that the embodiments disclosed herein can be used for other types of systems in any number of different fields that control the flow of a fluid without departing from the spirit and scope of the claimed invention.

For example, but not by way of limitation, it is expressly contemplated that the valve can be readily configured to control the flow of biomedical fluids or medicines in the medical arts, the flow of fuels in a combustion engine, the flow of gaseous fluid in a pressurized gas system, and so on. Any system in which quick evacuation of a fluidic reservoir or change in the flow of fluids is desirable can be advantageously modified to incorporate the invention as disclosed and claimed herein.

What is claimed is:

1. A valve which selectively supplies and releases fluid to and from a fluidic reservoir, comprising:

a housing which defines an interior chamber;

an annular first seat surface supported within the housing in communication with the interior chamber, the first seat surface defining a first seat orifice;

a valve assembly configured for sliding movement within the housing, the valve assembly comprising a hollow stem with a distal end having an annular second seat surface, the second seat surface extendable through the first seat orifice; and a sealing member disposed within the interior chamber, wherein in a first valve position the second seat surface extends through the first seat surface and abuttingly supports the sealing member to establish a fluidic seal between the sealing member and the second seat surface, permitting inlet fluid to pass from the interior chamber into a gap between the sealing member and the first seat surface and on to charge the reservoir, and wherein in a second valve position the second seat surface is retracted away from the first seat surface so that the first seat surface abuttingly supports the sealing member to establish a fluidic seal between the sealing member and the first seat surface, permitting outlet fluid to pass from the reservoir into a gap between the sealing member and the second seat surface to discharge the reservoir.

2. The valve of claim 1, wherein the interior chamber is characterized as a first interior chamber, wherein the valve assembly further comprises a piston configured for sliding movement within a second interior chamber defined within the housing, and wherein a portion of the inlet fluid is introduced into the second interior chamber to exert a fluidic force upon the piston to bias the valve assembly to the second valve position.

3. The valve of claim 2, wherein the housing further comprises an interior port which establishes fluidic communication between the first and second interior chambers.

4. The valve of claim 2, further comprising a biasing member coupled to the valve assembly which exerts a biasing force to bias the valve assembly to the first valve position in opposition to the fluidic force.

5. The valve of claim 4, wherein the biasing member comprises a spring.

6. The valve assembly of claim 4, wherein the biasing force is selected to be greater than the fluidic force when a pressure of the inlet fluid is within a selected operational range so that the valve nominally remains in the first valve position when the pressure of the inlet fluid remains within said operational range, and wherein the biasing force is further selected such that the fluidic force exceeds the biasing force and moves the valve to the second valve position when the pressure of the inlet fluid exceeds said operational range.

7. The valve of claim 1 characterized as a pilot valve configured to operate an adjacent main valve, wherein the reservoir comprises a dome of the main valve, and wherein the main valve establishes an overpressure path for the fluid when a pressure of the fluid exceeds a selected threshold.

8. The valve of claim 1, wherein the sealing member comprises a spherical ball.

9. The valve of claim 1, wherein the sealing member, the housing and the stem are all formed of a common material.

10. The valve of claim 9, wherein the common material comprises stainless steel so that the fluidic seals established by the sealing member with the first and second seat surfaces are metal-on-metal seals.

11. The valve of claim 1, wherein at least a selected one of the first and second annular seat surfaces comprises a layer of resilient material.

12. The valve of claim 1, further comprising a centering member within the first interior chamber which exerts a centering force upon the sealing member to maintain the sealing member in a centered relationship within the first interior chamber with respect to the first and second annular seat surfaces.

13. A valve, comprising:
a housing which defines an interior chamber and which supports a first seat surface in communication with the interior chamber;
a sealing member disposed within the interior chamber and configured contactingly abut the first seat surface to establish a fluidic seal;
a valve assembly configured for sliding movement within the housing, the valve assembly comprising a stem with a distal end having an annular second seat surface, the second seat surface extendable through a central orifice of the first seat surface,
wherein in a first valve position the second seat surface extends through the central orifice of the first seat surface to lift the sealing member off the second seat member and establish a fluidic seal between the sealing member and the second seat member, allowing fluid within the interior chamber to flow through a gap between the sealing member and the first seat surface and into the central orifice of the first seat orifice, and
wherein in a second valve position the second seat surface retracts to a position away from the first seat surface to lower the sealing member onto the first seat surface and establish a fluidic seal therebetween, allowing fluid to flow between the sealing member and the second seat surface.

14. The valve of claim 13, wherein the interior chamber is characterized as a first interior chamber, wherein the valve assembly further comprises a piston configured for sliding movement within a second interior chamber defined within the housing, and wherein a portion the fluid is introduced into the second interior chamber to exert a fluidic force upon the piston to bias the valve assembly to the second valve position.

15. The valve of claim 14, further comprising a biasing member coupled to the valve assembly which exerts a biasing force to bias the valve assembly to the first valve position in opposition to the fluidic force.

16. The valve of claim 13 characterized as a pilot valve, the pilot valve in combination with a main valve, wherein the pressurized fluid flows to a dome of the main valve when the pilot valve is in the first position, and wherein the pressurized fluid in the dome is discharged through the pilot valve when the pilot valve is in the second position.

17. The valve of claim 13, wherein the seating member comprises a spherical ball.

* * * * *